E. HARRISON.
Horse Hay-Forks.

No. 154,983. Patented Sept. 15, 1874.

Witnesses
John L. Borne
C. M. Richardson

Inventor
Edmund Harrison
by Dewey & Co.
Att'ys

UNITED STATES PATENT OFFICE.

EDMUND HARRISON, OF HOLLISTER, CALIFORNIA.

IMPROVEMENT IN HORSE HAY-FORKS.

Specification forming part of Letters Patent No. 154,983, dated September 15, 1874; application filed May 12, 1874.

*To all whom it may concern:*

Be it known that I, EDMUND HARRISON, of Hollister, San Benito county, State of California, have invented an Improvement in Horse Hay-Forks; and I do hereby declare the following description and accompanying drawings are sufficient to enable any person skilled in the art or science to which it most nearly appertains to make and use my said invention or improvement without further invention or experiment.

My invention relates to certain improvements in that class of forks which are employed to lift large masses of hay or straw, either for the use of the thrashing-machine, or for stacking or loading; and it consists in certain details of construction, as hereinafter more fully described, whereby I strengthen, cheapen, and simplify the fork.

Figure 1:
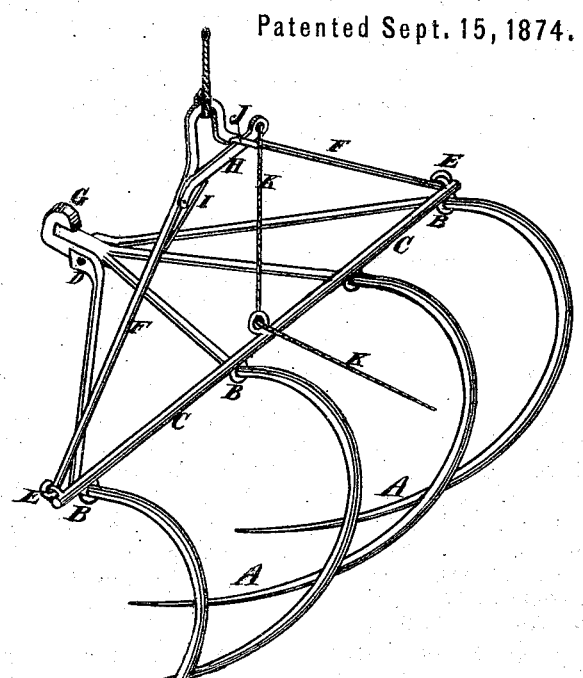
Figure 2:
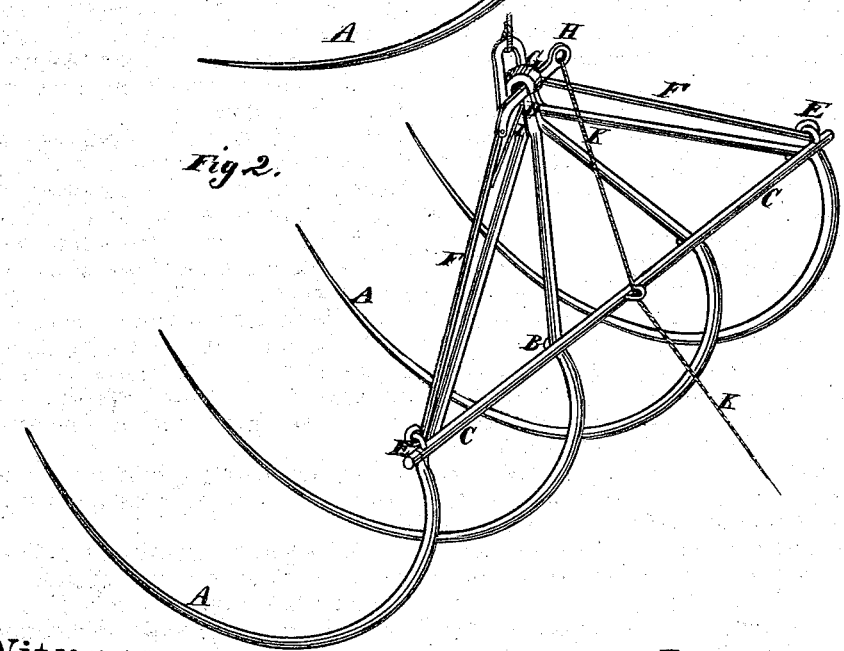

Referring to the accompanying drawings for a more complete explanation of my invention, Figure 1 is a view showing the fork ready to discharge. Fig. 2 shows the fork in position to hold a load.

A A are the tines of my fork, which are bent so as to grasp and lift the load of hay or straw to the best advantage. These tines pass through eyes B upon the cross-bar C, which keep them well apart and steady them. Above the cross-bar the tines are continued, and brought together and strongly secured at the point D. Strong eyes, E, are secured to the outer ends of the bar C, and a triangular frame is formed by the arms F F, which are secured to the eyes E at the ends, so as to allow the fork to swing, and these arms meet in the middle above the head D of the tines, forming a strong eye, from which the whole is suspended.

It will be manifest, that, when suspended, the weight of the fork-tines will cause the head D to swing forward, and allow any load to be discharged unless it is confined in some manner. In order to do this, and at the same time make it easy to be detached, when desired, I form a hook, G, as shown, at the head of the fork, so that this hook just swings clear between the sides of the arms F F, where they are bent to form the eye. A latch, H, is pivoted to one of the arms F, and extended across the back to the other arm, so that when it is pressed upward into the hook G, it will prevent the fork from swinging forward, and, as the latch rests across the small space between the arms F, it will be seen that it will have great strength to resist the strain upon the fork.

Another great advantage possessed by my latch is, that it lies flat across the back of the fork, and does not project so as to catch or interfere with anything, if it is desired to hoist alongside of a mast or vertical post.

In order to keep this latch up, and make it catch in the hook G, I employ a spring, I, secured to one of the arms, and this keeps the latch in position. A guiding-staple, J, upon the opposite arm holds the latch in place, and limits the motion.

When it is desired to discharge the load, all that will be necessary is to pull a cord, K, attached to an eye in the outer end of the latch.

By this construction I am enabled to make my fork very strong, the tines being formed in a single piece each, instead of being driven into a wooden head, with a liability to split, and it is very simple and cheap.

My latching device is very strong, and, by its position across the space in which the head swings, it is capable of resisting a heavy load, and at the same time is entirely out of the way.

Having thus described my invention, what I claim, and desire to secure by Letters Patent, is—

A horse hay-fork consisting of the tines A and bar C, provided with the eyes B, in combination with the frame F, latch H, spring I, and hook G, all constructed to operate substantially as and for the purpose set forth.

In witness whereof I hereunto set my hand and seal.

EDMUND HARRISON. [L. S.]

Witnesses:
GEO. H. STRONG,
C. M. RICHARDSON.